US011734575B2

(12) United States Patent
Agravante et al.

(10) Patent No.: US 11,734,575 B2
(45) Date of Patent: Aug. 22, 2023

(54) SEQUENTIAL LEARNING OF CONSTRAINTS FOR HIERARCHICAL REINFORCEMENT LEARNING

(71) Applicant: INTERNATIONAL BUSINESS MACHINES CORPORATION, Armonk, NY (US)

(72) Inventors: Don Joven Ravoy Agravante, Tokyo (JP); Giovanni De De Magistris, Tokyo (JP); Tu-Hoa Pham, Tokyo (JP); Ryuki Tachibana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1370 days.

(21) Appl. No.: 16/048,569

(22) Filed: Jul. 30, 2018

(65) Prior Publication Data

US 2020/0034704 A1    Jan. 30, 2020

(51) Int. Cl.
  *G06N 3/088* (2023.01)
  *G06N 3/045* (2023.01)
  *G06N 3/08* (2023.01)

(52) U.S. Cl.
  CPC ............ *G06N 3/088* (2013.01); *G06N 3/045* (2023.01); *G06N 3/08* (2013.01)

(58) Field of Classification Search
  CPC ......... G06N 3/088; G06N 3/0454; G06N 3/08
  See application file for complete search history.

(56) References Cited

U.S. PATENT DOCUMENTS

| 8,943,008 | B2 | 1/2015 | Ponulak et al. |
| 9,530,412 | B2 | 12/2016 | Selfridge |
| 9,858,529 | B2 | 1/2018 | Adams et al. |

(Continued)

FOREIGN PATENT DOCUMENTS

| CN | 107463878 | 12/2017 |
| CN | 107909153 A | 4/2018 |

(Continued)

OTHER PUBLICATIONS

Le ("Hierarchical Imitation and Reinforcement Learning") Proceedings of the 35 th International Conference on Machine Learning, Stockholm, Sweden, PMLR 80, 2018 (Year: 2018).*

(Continued)

*Primary Examiner* — Kakali Chaki
*Assistant Examiner* — Su-Ting Chuang
(74) *Attorney, Agent, or Firm* — Tutunjian & Bitetto, P.C.; Randy Emilio Tejeda

(57) ABSTRACT

A computer-implemented method, computer program product, and computer processing system are provided for Hierarchical Reinforcement Learning (HRL) with a target task. The method includes obtaining, by a processor device, a sequence of tasks based on hierarchical relations between the tasks, the tasks constituting the target task. The method further includes learning, by a processor device, a sequence of constraints corresponding to the sequence of tasks by repeating, for each of the tasks in the sequence, reinforcement learning and supervised learning with a set of good samples and a set of bad samples and by applying an obtained constraint for a current task to a next task.

18 Claims, 6 Drawing Sheets

(56) References Cited

U.S. PATENT DOCUMENTS

| | | |
|---|---|---|
| 2017/0213150 A1 | 7/2017 | Arel et al. |
| 2017/0228641 A1 | 8/2017 | Sohn |
| 2017/0293844 A1 | 10/2017 | Gombolay et al. |
| 2017/0337682 A1 | 11/2017 | Liao et al. |
| 2018/0012137 A1 | 1/2018 | Wright et al. |
| 2019/0019087 A1 | 1/2019 | Fukui |

FOREIGN PATENT DOCUMENTS

| | | |
|---|---|---|
| CN | 102402712 A | 4/2021 |
| EP | 3 242 255 | 8/2017 |

OTHER PUBLICATIONS

Dietterich ("Hierarchical reinforcement learning with the MAXQ value function decomposition") Journal of Articial Intelligence Research 13 (2000) 227-303 (Year: 2000).*

Yang ("Physical Human-Robot Adversarial Gameplay") 2018 RSS (Year: 2018).*

Todorov ("From task parameters to motor synergies: A hierarchical framework for approximately optimal control of redundant manipulators") Journal of Robotic Systems 22(11), 691-710 (2005) (Year: 2005).*

Hengst ("Safe state abstraction and discounting in hierarchical reinforcement learning") M.A. Orgun and J. Thornton (Eds.): AI 2007, LNAI 4830, pp. 58-67, 2007 (Year: 2007).*

Pinto("Robust adversarial reinforcement learning") arXiv:1703.02702v1 [cs.LG] Mar. 8, 2017 (Year: 2017).*

Amos ("OptNet: Differentiable Optimization as a Layer in Neural Network") Proceedings of the 34 th International Conference on Machine Learning, Sydney, Australia, PMLR 70, 2017. (Year: 2017).*

Rusu ("Policy distillation") ICLR 2016 arXiv:1511.06295v2 [cs.LG] Jan. 7, 2016 (Year: 2016).*

Achiam et al., "Constrained Policy Optimization", Proceedings of the 34 th International Conference on Machine Learning, Aug. 2017, 18 pages.

Bakker et al., "Hierarchical Reinforcement Learning Based on Subgoal Discovery and Subpolicy Specialization", Proceedings of the 8—th Conference on Intelligent Autonomous Systems, May 2009, 8 pages.

Barto, Andrew G., "Recent Advances in Hierarchical Reinforcement Learning", Discrete Event Dynamic Systems: Theory and Applications (DISC), Kluwer Academic Publishers, Mar. 1999, pp. 41-77.

Berseth et al., "Progressive Reinforcement Learning with Distillation for Multi-Skilled Motion Control", Published as a conference paper at ICLR 2018, May 2018, pp. 1-15.

Duan et al., "Benchmarking Deep Reinforcement Learning for Continuous Control", Proceedings of the 33rd International Conference on Machine Learning, Jun. 2016, 10 pages.

Florensa et al., "Stochastic Neural Networks for Hierarchical Reinforcement Learning", Published as a conference paper at ICLR 2017, Apr. 2017, pp. 1-17.

Pham et al., "OptLayer—Practical Constrained Optimization for Deep Reinforcement Learning in the Real World", arXiv:1709.07643V2 [cs RO] Feb. 23, 2018, 8 pages.

Schlötzer, Susanne, "Hierarchical Reinforcement Learning", Institute of Automatic Control Engineering, Joint Advanced Student School, Mar. 2008, 38 pages.

Argall et al., "A Survey of Robot Learning from Demonstration", Robotics and Autonomous Systems, Oct. 2008, pp. 1-16.

Baram et al., "End-to-End Differentiable Adversarial Imitation Learning", Proceedings of the 34 th International Conference on Machine Learning, Aug. 2017, 10 pages.

Brys et al., "Reinforcement Learning from Demonstration through Shaping", Proceedings of the Twenty-Fourth International Joint Conference on Artificial Intelligence (IJCAI 2015), Jul. 2015, pp. 3352-3358.

Gao et al., "Reinforcement Learning from Imperfect Demonstrations", Proceedings of the 35th International Conference on Machine Learning, Jul. 2018, 13 pages.

Ho et al., "Generative Adversarial Imitation Learning", arXiv:1606.03476v1 [cs.LG] Jun. 10, 2016, pp. 1-14.

Kumar et al., "Rewards-Driven Robot Learning from Demonstrations", EDIC Research Proposal, Nov. 2013, pp. 1-9.

Ng et al., "Algorithms for Inverse Reinforcement Learning", 17th International Conf. on Machine Learning, Feb. 2000, 8 pages.

Ross et al., "A Reduction of Imitation Learning and Structured Prediction to No. Regret Online Learning", Proceedings of the 14th International Conference on Artificial Intelligence and Statistics (AISTATS) 2011, Apr. 2011, pp. 627-635.

Schulman et al., "Trust Region Policy Optimization", Proceedings of the 31st International Conference on Machine Learning, Jun. 2014, 16 pages.

Dalal et al., "Safe Exploration in Continuous Action Spaces", porarXiv: 1801.08757v1 [cs.AI] Jan. 26, 2018, 9 pages.

List of IBM Patents or Patent Applications Treated as Related dated Jul. 30, 2018, 2 pages.

Price, Bob, et al. "Accelerating Reinforcement Learning through Implicit Imitation", Journal of Artificial Intelligence Research 19, AI Access Foundation. Dec. 2003, pp. 569-629.

Bansal, Trapit, et al. "Emergent Complexity via Multi-Agent Competition", Published as a conference paper at ICLR 2018, arXiv:1710.03748v3. Mar. 14, 2018, pp. 1-12.

Lin, Zhiyu, et al. "Explore, Exploiter Listen: Combining Human Feedback and Policy Model to Speed up Deep Reinforcement Learning in 3D Worids", Association for the Advancement of Artificial Intelligence, arXiv: 1709.03969. Sep. 12, 2017, pp. 1-8.

U.S. Office Action issued in U.S. Appl. No. 16/048,810 dated Aug. 20, 2021, pp. 1-82.

Ma et al., "Improved Robustness and Safety for Autonomous Vehicle Control with Adversarial Reinforcement Learning", Jun. 26-30, 2018, 2018 IEEE Intelligent Vehicles Symposium (IV), pp. 1665-1671. (Year 2018).

U.S. Office Action issued in U.S. Appl. No. 16/048,810 dated Mar. 3, 2022, pp. 1-54.

Chen et al., "Decentralized Non-communicating Multiagent Collision Avoidance with Deep Reinforcement Learning", 2017 IEEE International Conference on Robotics and Automation (ICRA), May-Jun. 2017, pp. 285-292.

Hwang et al., "Inverse Reinforcement Learning based on Critical State", 16th World Congress of the International Fuzzy Systems Association (IFSA) 9th Conference of the European Society for Fuzzy Logic and Technology (EUSFLAT), Jun.-Jul. 2015, pp. 771-775.

Johnson et al., "Semi-Supervised Nonlinear Distance Metric Learning via Forests of Max-Margin Clustering Hierarchies", arXiv, Feb. 2014, 11 pages.

Judah et al., "Reinforcement Learning Via Practice and Critique Advice", Proceedings of the Twenty-Fourth AAAI Conference on Artificial Intelligence, Jul. 2010, pp. 481-486.

Zhu et al., "Combining Dynamic Reward Shaping and Action Shaping for Coordinating Multi-Agent Learning", 2013 IEEE/WIC/ACM International Conferences on Web Intelligence (WI) and Intelligent Agent Technology (IAT), Nov. 2013, pp. 321-328.

Datta et al., "Probabilistic Constraint Handling in the Framework of Joint Evolutionary-Classical Optimization with Engineering Applications", Kanpur Genetic Algorithms Laboratory (KanGAL), Mar. 2012, 8 pages.

U.S. Office Action issued in U.S. Appl. No. 16/048,697 dated Oct. 27, 2021, pp. 1-41.

Office Action from CN 201910679383.2 dated Feb. 14, 2023 (23 pages).

* cited by examiner

SEQUENTIAL LEARNING OF CONSTRAINTS FOR HIERARCHICAL REINFORCEMENT LEARNING

BACKGROUND

Technical Field

The present invention generally relates to machine learning, and more particularly to sequential learning of constraints for Hierarchical Reinforcement Learning (HRL).

Description of the Related Art

Reinforcement learning (RL) is a powerful class of algorithms that can learn the optimal actions to take in complex environments. The idea behind RL is that an agent will learn from an environment by interacting with the environment and receiving rewards for performing actions. Hierarchical RL (HRL) extends RL by using it in a hierarchical structure. However, even the state-of-the-art RL algorithms completely fail in hierarchical tasks. Hence, there is a need for a RL technique usable for hierarchical tasks.

SUMMARY

According to an aspect of the present invention, a computer-implemented method is provided for Hierarchical Reinforcement Learning (HRL) with a target task. The method includes obtaining, by a processor device, a sequence of tasks based on hierarchical relations between the tasks, the tasks constituting the target task. The method further includes learning, by a processor device, a sequence of constraints corresponding to the sequence of tasks by repeating, for each of the tasks in the sequence, reinforcement learning and supervised learning with a set of good samples and a set of bad samples and by applying an obtained constraint for a current task to a next task.

According to another aspect of the present invention, a computer program product is provided for Hierarchical Reinforcement Learning (HRL) with a target task. The computer program product includes a non-transitory computer readable storage medium having program instructions embodied therewith. The program instructions are executable by a computer to cause the computer to perform a method. The method includes obtaining, by a processor device, a sequence of tasks based on hierarchical relations between the tasks, the tasks constituting the target task. The method further includes learning, by a processor device, a sequence of constraints corresponding to the sequence of tasks by repeating, for each of the tasks in the sequence, reinforcement learning and supervised learning with a set of good samples and a set of bad samples and by applying an obtained constraint for a current task to a next task.

According to yet another aspect of the present invention, a computer processing system is provided for Hierarchical Reinforcement Learning (HRL) with a target task. The computer processing system includes a memory for storing program code. The computer processing system further includes a processor device operatively coupled to the memory for running the program code to obtain a sequence of tasks based on hierarchical relations between the tasks, the tasks constituting the target task. The processor device further runs the program code to learn a sequence of constraints corresponding to the sequence of tasks by repeating, for each of the tasks in the sequence, reinforcement learning and supervised learning with a set of good samples and a set of bad samples and by applying an obtained constraint for a current task to a next task.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to sequential learning of constraints for Hierarchical Reinforcement Learning (HRL).

In comparison to all conventional HRL methods, the present invention uses constraints for defining the hierarchy. The constraints can reduce training time and also can allow prioritization of tasks. Also in comparison to all conventional HRL methods, each hierarchy level is interpretable as a task and can be transferred. A task is an instance of a reinforcement learning problem.

In an embodiment, a hierarchy is structured by learning a sequence of 1, . . . , n tasks. More specifically, in an embodiment, a sequence of constraints is learned, each of the constraints relating to a task, and each applied to a next task in the sequence in order to learn the constraint for the next task.

Hence, in an embodiment, the present invention can involve the following technique to learn and add constraints for HRL:

Perform constrained Reinforcement Learning (RL).
Perform antagonistic RL (aRL).
Generate positive demonstrations from RL.
Generate negative demonstrations from aRL.
Learn constraints from positive and negative demonstrations.
Add constraints.

As used herein, the term "constraint" refers to a condition that an action has to satisfy in order to be considered valid with respect to a given task. Such a constraint can be formulated as satisfying a Boolean function that can involve inequalities, equalities, or combinations thereof. Thus, for example, for robotic applications, constraints can include and/or otherwise relate, but are not limited to, avoiding collisions while traveling to a target, maintaining power consumption within a chosen level, and/or fulfilling other performance or safety metrics. For Advanced Driver Assistance Systems (ADAS), constraints can include and/or otherwise relate, but are not limited to, avoiding collisions while traveling to a target, following a chosen route, complying with local speed limits, and other traffic rules. The preceding constraints are merely illustrative and depend upon the application, as readily appreciated by one of ordinary skill in the art given the teachings of the present invention herein, while maintaining the spirit of the present invention.

Figure 1:
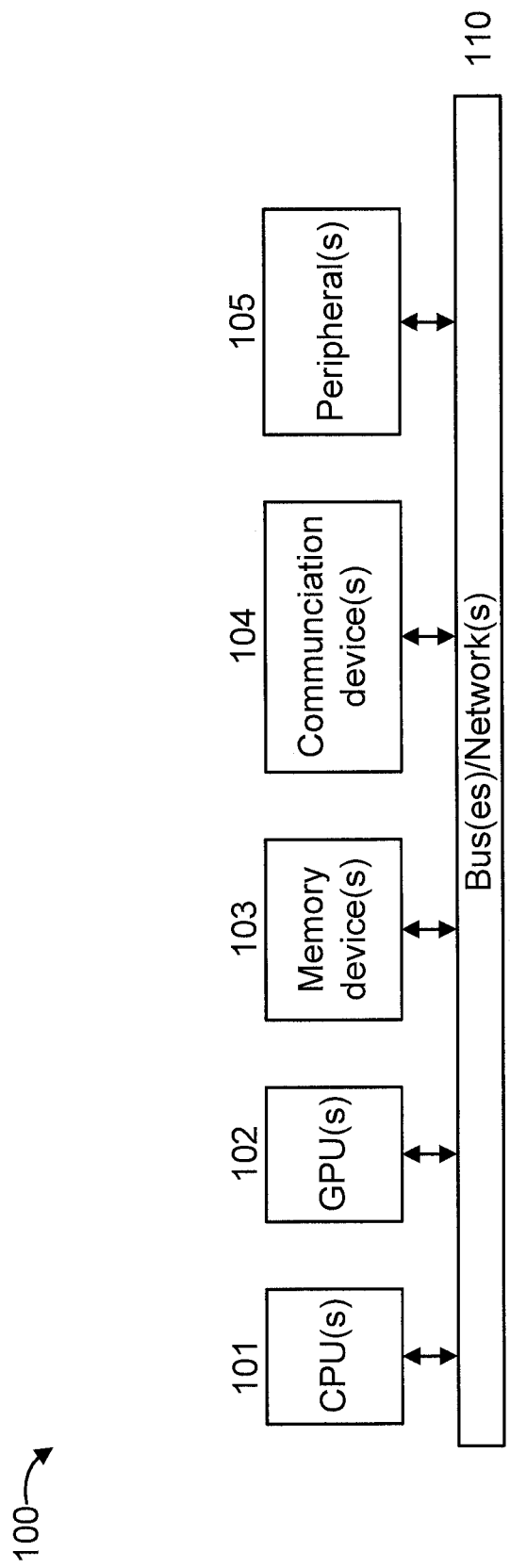
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110). Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 5-6). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
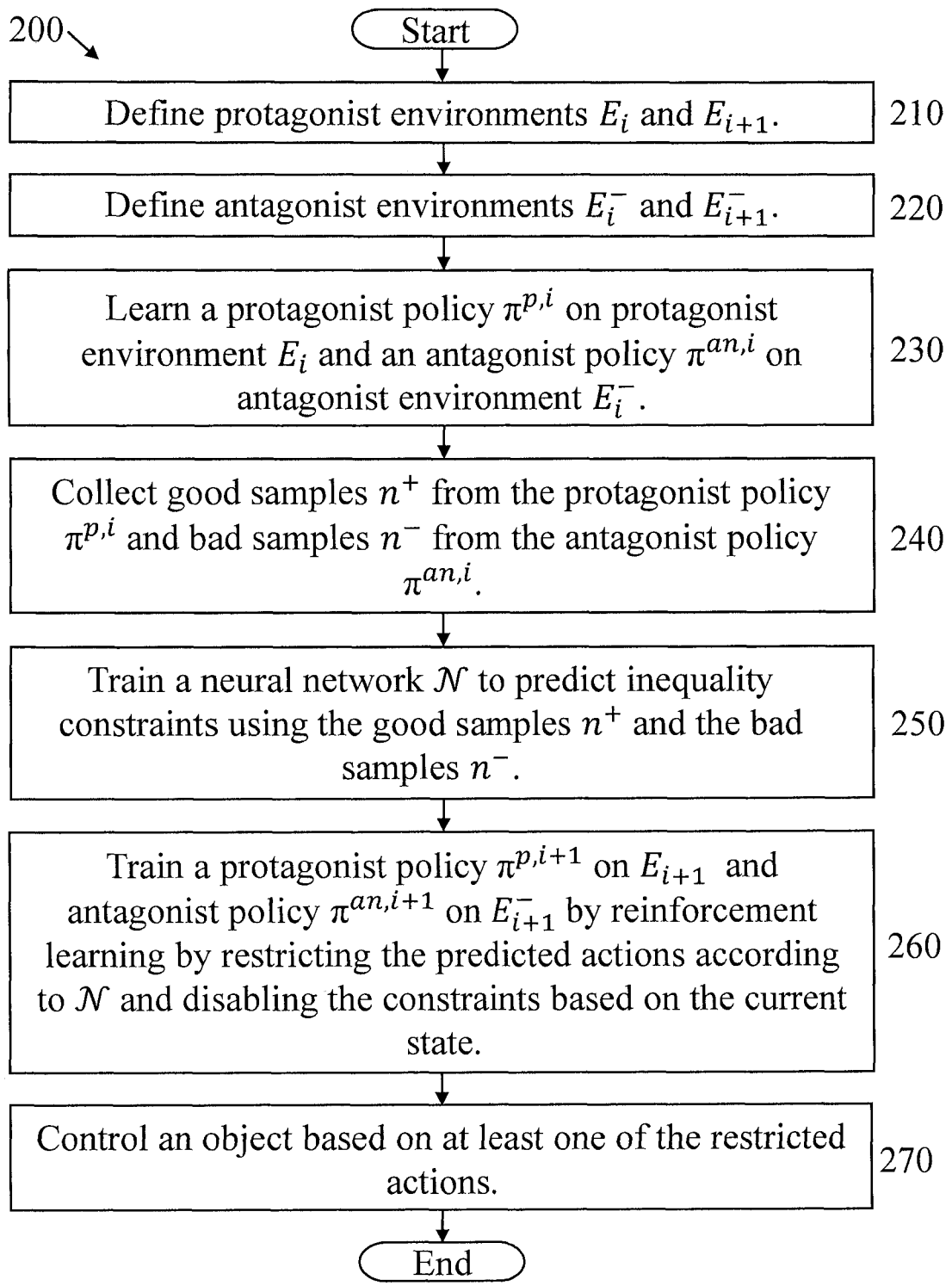
FIG. 2 is a flow diagram showing an exemplary method for sequential learning of constraints for hierarchical reinforcement learning, in accordance with an embodiment of the present invention.

FIG. 2 is a flow diagram showing an exemplary method 200 for sequential learning of constraints for hierarchical reinforcement learning, in accordance with an embodiment of the present invention. The method 200 structures the hierarchy by learning a sequence of 1, n tasks. Specifically, the method 200 learns a sequence of constraints, each one related to a task, to apply to the next tasks.

The method is performed for each task i=1, . . . , n-1.

At block 210, define protagonist environments $E_i$ and $E_{i+1}$.

At block 220, define antagonist environments $E_i^-$ and $E_{i+1}^-$ (e.g., opposite reward).

At block 230, learn a protagonist policy $\pi^{p,i}$ on protagonist environment $E_i$ and an antagonist policy $\pi^{an,i}$ on antagonist environment $E_i^-$.

At block 240, collect good (positive) samples $n^+$ from the protagonist policy $\pi^{p,i}$ and bad (negative) samples $n^-$ from the antagonist policy $\pi^{an,i}$.

At block 250, train a neural network N to predict inequality constraints using the good samples $n^+$ and the bad samples $n^-$.

At block 260, train a protagonist policy $\pi^{p,i+1}$ on protagonist environment $E_{i+1}$ and antagonist policy $\pi^{an,i+1}$ on antagonist environment $E_{i+1}^-$ by reinforcement learning by restricting the predicted actions according to N and disabling the constraints based on the current state (e.g., value). Disabling the constraints means not using N such that there are no restrictions for the actions. This is done if a certain condition is met, for example, having the expected value of the current state above a pre-defined threshold.

At block 270, control an object based on at least one of the restricted actions. The object can be, for example, but not limited to, a hardware object. The hardware object can be, but is not limited to, a computer, a workplace machine, a robot, a vehicle (e.g., a car, etc.), and so forth. The action can be performed to, for example, make the robot perform an operation (such as manufacturing another object), controlling the workplace machine to mitigate a potential harm to a user thereof, and so forth. In an embodiment, the restricted action provides a better result than if the action was not restricted in accordance with the present invention. For example, in the case of reaching a target, the restricted action can result in reaching the target faster than an corresponding unrestricted version of the action (e.g., by avoiding a path having extra unnecessary steps in order to arrive at a target location and/or target object). In the case of a computer, the action can be to bypass a computer operation that is likely not to improve an outcome provided by the computer in order to improve operation of the computer by avoiding wasting resources that would otherwise be consumed by performing the bypassed operation. These and other actions are readily contemplated by one of ordinary skill in the art, given the teachings of the present invention provided herein, while maintaining the spirit of the present invention.

Figure 3:
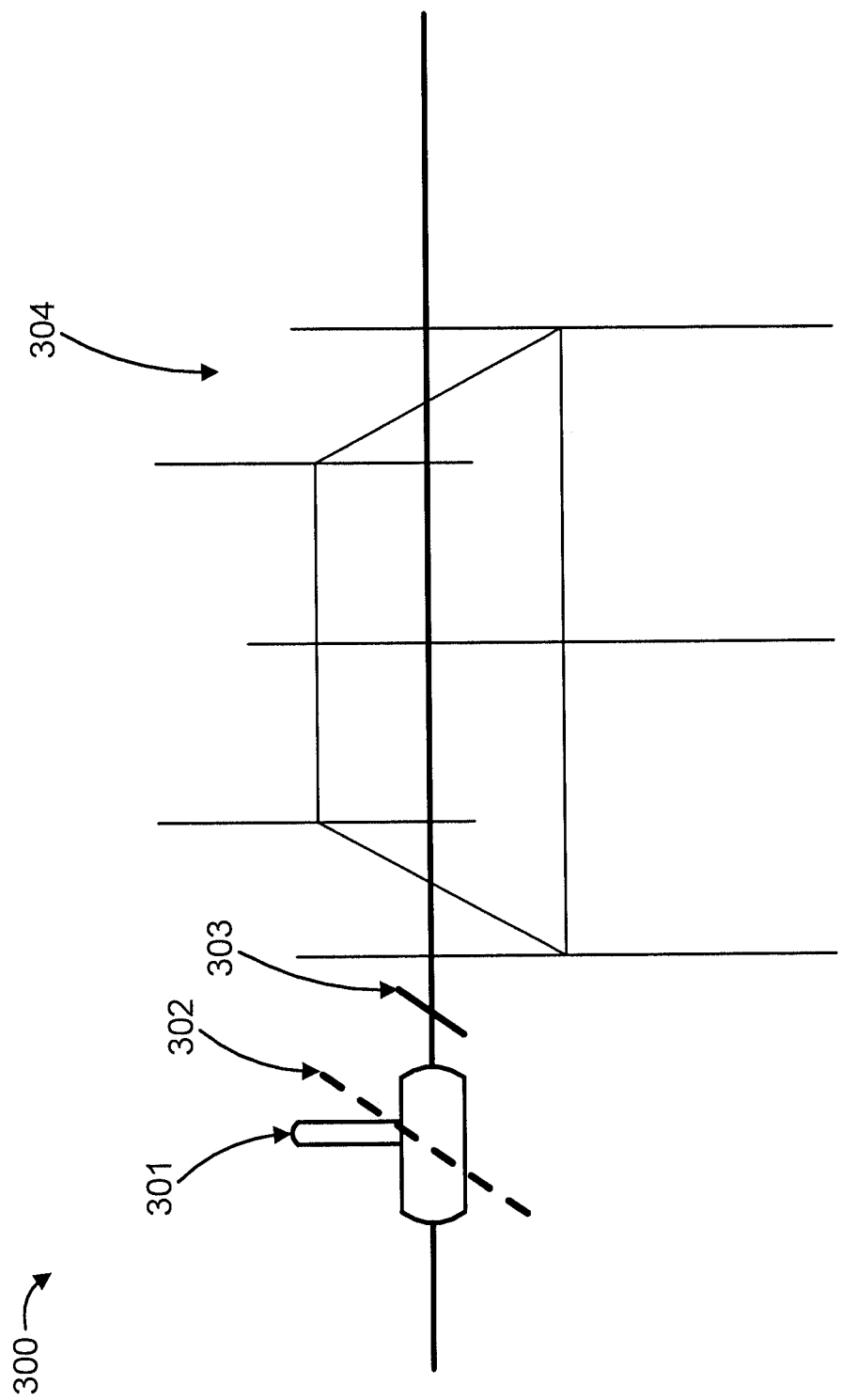
FIG. 3 is a block diagram showing an exemplary target environment to which the present invention can be applied, in accordance with an embodiment of the present invention.

FIG. 3 is a block diagram showing an exemplary target environment 300 to which the present invention can be applied, in accordance with an embodiment of the present invention.

The target environment 300 involves two tasks, namely (Task 1) balancing a pole 301, and (Task 2) reaching the target 302 (relative to the current position 303). The pole 301 and target 302 are shown also relative to an apparatus (e.g., a floor/rail system) 304.

Figure 4:
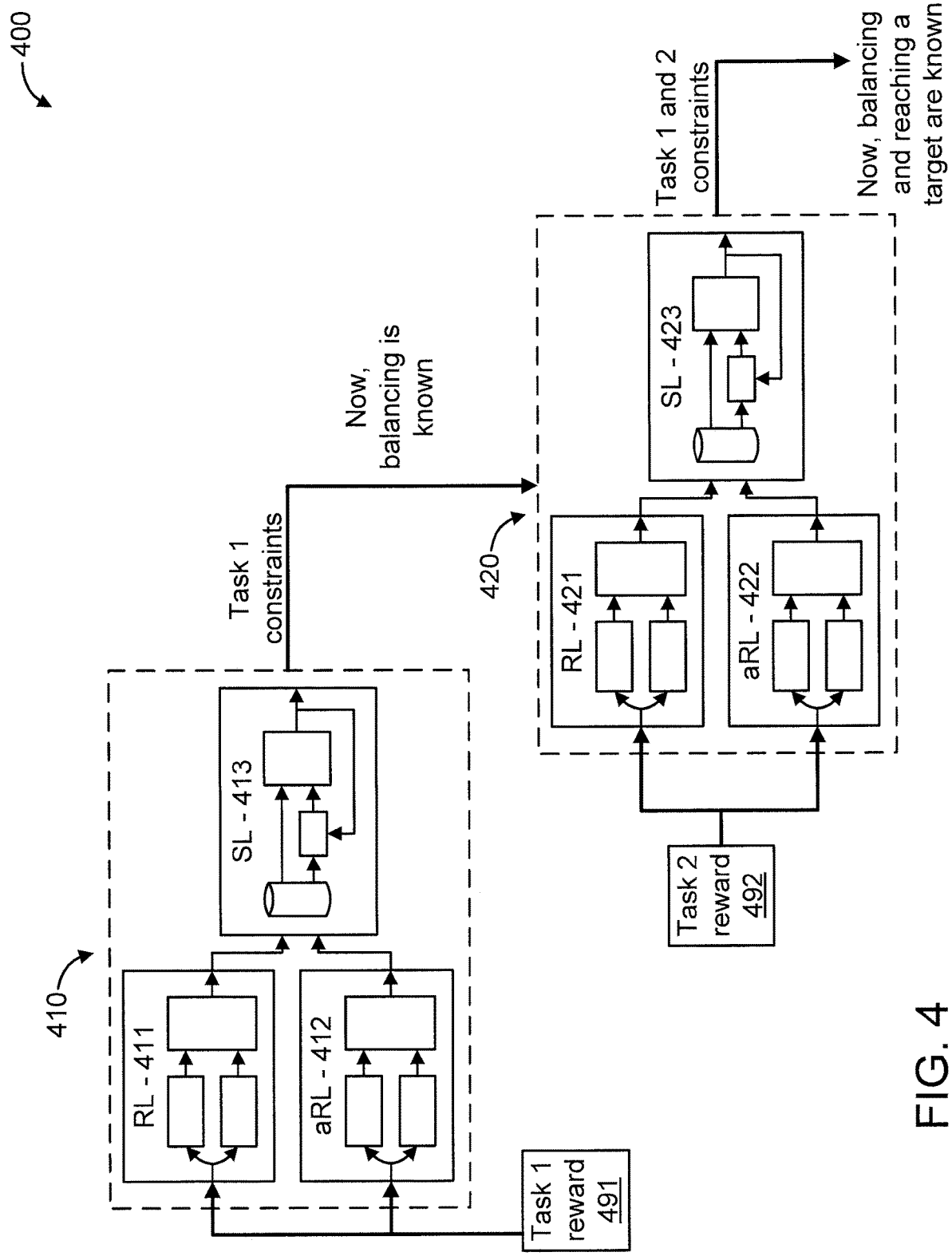
FIG. 4 is a block diagram showing an exemplary configuration for sequential learning of constraints for hierarchical reinforcement learning, in accordance with an embodiment of the present invention.

FIG. 4 is a block diagram showing an exemplary configuration 400 for sequential learning of constraints for hierarchical reinforcement learning, in accordance with an embodiment of the present invention. In FIG. 4, the term "RL" denotes "Reinforcement Learning", the term "aRL" denotes "Antagonistic Reinforcement Learning", and the term "SL" denotes Supervised Learning. The configuration 400 pertains to the target environment 300 of FIG. 3 and the two tasks described with respect thereto (namely Task 1 and Task 2).

The configuration 400 is formed by unfolding the closed loop into a hierarchy, defining different tasks at each hierarchy level as follows:

At each RL step: learn task, RL learns good examples needed for SL, antagonist RL (aRL) learns bad examples needed for SL.

At each SL step: extract the task into a constraint

Hence, at a block 410, a Task 1 reward 491 is provided to an RL step 411 and an aRL step 412. The RL step 411 learns how to balance. The aRL step 412 leans how to fall. Outputs of the RL step 411 and the aRL step 412 are input to a SL step 413. From block 410, Task 1 constraints are provided. The SL step 413 results in a neural network N that, given an input state, can be used to output the matrix (G) and vector (h) which represent a linear constraint on the action such that the Task 1 constraints are provided. At this point (conclusion of block 410), the pole balancing (that is, Task 1) is known.

At a block 420, a Task 2 reward 492 is provided to an RL step 421 and an aRL step 422. The RL step 421 learns how to reach the target point while staying balanced. The aRL step 422 learns how to go far from the target point while staying balanced. Outputs of the RL step 421 and the aRL step 422 are input to a SL step 423. From block 420, Task 1 and Task 2 constraints are provided. The SL step 423 results in a neural network N that, given an input state, can be used to output the matrix (G) and vector (h) which represent a linear constraint on the action such that the Task 1 and Task 2 constraints are provided. At this point (conclusion of block 410), the pole balancing (that is, Task 1) and target reaching (that is, Task 2) are known.

The constraints can be used to reduce training time of RL by reducing the set of actions to be explored. This is because most of the RL training time is in doing exploratory actions in the environment.

Moreover, the constraints can be used to prioritize the tasks in order to obtain an intended execution order of the tasks. This can be useful for dependency issues and other advantages as readily appreciated by one of ordinary skill in the art, given the teachings of the present invention provided herein.

A description will now be given of an embodiment involving automatically removing/loosening constraints.

It is to be appreciated that in some cases, it can be desirable to remove or loosen the constraints. In the example here, when the pole is close to completely vertical, then it is far from falling. In this state, there is no need to constrain the actions. Although the best action considering the current task of balancing the pole is to keep it vertical, the next tasks may require a different action. In the example here, the next task is reaching a target which requires the pole to be tipped toward the target. If very conservative constraints are learned on the first task to keep the pole near vertical then it may slow down the execution of the second task. Another example is when a robot is sufficiently far from an obstacle then its motion does not need to be constrained.

The original constraints are of the following form: $G(s)a \leq h(s)$, where s is the state, a is the action, G is the constraint matrix, and h is the constraint vector.

We relax the original constraints as a function of the value function.

Accordingly, the relaxed constraint set C is as follows:

$$C = \begin{cases} G(s)a \leq h(s), & \text{if } V(s) \geq \overline{V} \\ \emptyset & \text{otherwise} \end{cases}$$

where V(s) is a value function. The value function is a function that indicates the maximum expected future reward the agent will get at each state.

A description will now be given regarding some exemplary applications to which the present invention can be applied, in accordance with an embodiment of the present invention.

For example, the present invention can be used for robotics applications, a music recommendation system, factory management, garbage combustion, Advanced Driver Assistance Systems (ADAS), and so forth.

Further regarding robotics applications, the present invention can be applied to optimize balance, optimize maze solving, and so forth.

Further regarding a music recommendation system, the present invention can be used to minimize the user skipping songs, maximize the available and/or played "song variety", and so forth.

Further regarding factory management, the present invention can be used to keep production quality above a certain level, minimize energy costs, maximize worker happiness, and so forth.

Further regarding garbage combustion, the present invention can be used to maintain temperature at a certain level, minimize garbage segregation work, and so forth.

Further regarding ADAS, the present invention can be used to avoid collisions, control vehicle systems (e.g., in order to arrive at a target destination and/or to avoid collisions). The vehicle functions that can be controlled include, but are not limited to, acceleration, braking, steering, and so forth.

It is to be appreciated that the preceding applications are merely illustrative and that one of ordinary skill in the art will contemplate these and a myriad of other applications, given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
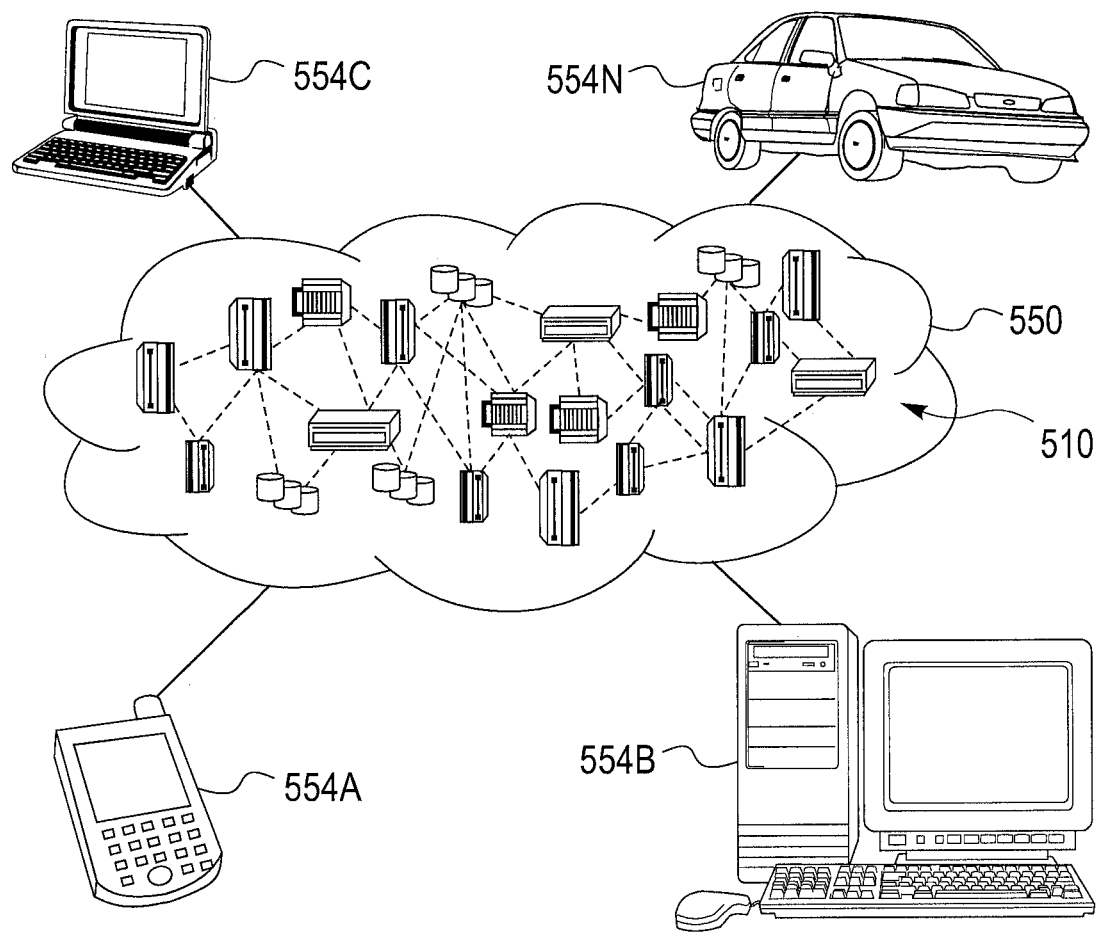
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
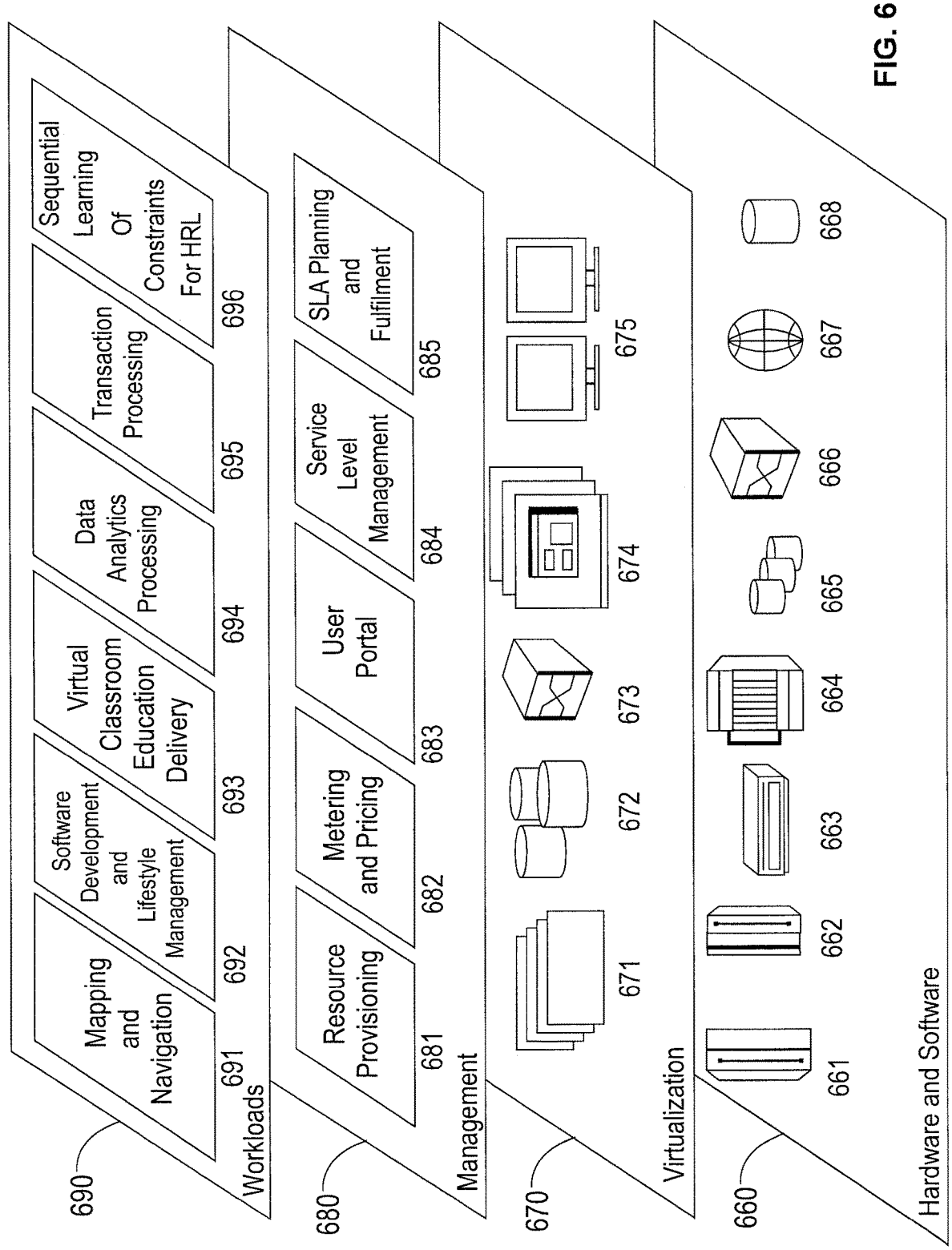
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and sequential learning of constraints for Hierarchical Reinforcement Learning (HRL) 696.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for Hierarchical Reinforcement Learning (HRL) with a target task, comprising:
   obtaining, by a processor device, a sequence of tasks based on hierarchical relations between the tasks, the tasks constituting the target task; and
   learning, by a processor device, a sequence of Boolean constraints that an action satisfies to be considered valid and that correspond to the sequence of tasks by repeating, for each of the tasks in the sequence, reinforcement learning and supervised learning with a set of good samples and a set of bad samples and by applying an obtained constraint for a current task to a next task,
   wherein each performance of the repeating step comprises training a neural network to predict a constraint corresponding to the current task with the set of good samples and the set of bad samples to provide outputs of the reinforcement learning as inputs to the supervised learning.

2. The computer-implemented method of claim 1, wherein the each performance of the repeating step further comprises training a protagonist policy and an antagonist policy by reinforcement learning by restricting predicted actions according to the trained neural network.

3. The computer-implemented method of claim 1, wherein the constraint is an inequality constraint.

4. The computer-implemented method of claim 1, wherein said learning step comprises applying a respective reward as an input to a non-antagonistic reinforcement learning neural network and an antagonist reinforcement learning neural network, and applying an output of each of the non-antagonistic reinforcement learning and antagonistic reinforcement learning neural networks to a supervised learning neural network to obtain a respective one of the constraints of the sequence.

5. The computer-implemented method of claim 1, wherein the constraints are used to prioritize the tasks by imposing a particular execution order on the tasks.

6. The computer-implemented method of claim 1, further comprising disabling one or more of the constraints based on a current state of a value function, the value function indicating a maximum expected future reward an agent will get at a given state.

7. The computer-implemented method of claim 1, wherein each of the tasks in the sequence corresponds to a respective hierarchy level.

8. The computer-implemented method of claim 1, wherein outputs of the supervised learning comprise a constraint matrix and a constraint vector collectively representing a linear action constraint.

9. A computer program product for Hierarchical Reinforcement Learning (HRL) with a target task, the computer program product comprising a non-transitory computer readable storage medium having program instructions embodied therewith, the program instructions executable by a computer to cause the computer to perform a method comprising:
   obtaining, by a processor device, a sequence of tasks based on hierarchical relations between the tasks, the tasks constituting the target task; and
   learning, by a processor device, a sequence of Boolean constraints that an action satisfies to be considered valid and that correspond to the sequence of tasks by repeating, for each of the tasks in the sequence, reinforcement learning and supervised learning with a set of good samples and a set of bad samples and by applying an obtained constraint for a current task to a next task,
   wherein each performance of the repeating step comprises training a neural network to predict a constraint corresponding to the current task with the set of good samples and the set of bad samples to provide outputs of the reinforcement learning as inputs to the supervised learning.

10. The computer program product of claim 9, wherein the each performance of the repeating step further comprises training a protagonist policy and an antagonist policy by reinforcement learning by restricting predicted actions according to the trained neural network.

11. The computer program product of claim 9, wherein the constraint is an inequality constraint.

12. The computer program product of claim 9, wherein said learning step comprises applying a respective reward as an input to a non-antagonistic reinforcement learning neural network and an antagonist reinforcement learning neural network, and applying an output of each of the non-antagonistic reinforcement learning and antagonistic reinforcement learning neural networks to a supervised learning neural network to obtain a respective one of the constraints of the sequence.

13. The computer program product of claim 9, wherein the constraints are used to prioritize the tasks by imposing a particular execution order on the tasks.

14. The computer program product of claim 9, wherein the method further comprises disabling one or more of the constraints based on a current state of a value function, the value function indicating a maximum expected future reward an agent will get at a given state.

15. The computer program product of claim 9, wherein each of the tasks in the sequence corresponds to a respective hierarchy level.

16. A computer processing system for Hierarchical Reinforcement Learning (HRL) with a target task, comprising:
- a memory for storing program code; and
- a processor device operatively coupled to the memory for running the program code to
  - obtain a sequence of tasks based on hierarchical relations between the tasks, the tasks constituting the target task; and
  - learn a sequence of Boolean constraints that an action satisfies to be considered valid and that correspond to the sequence of tasks by repeating, for each of the tasks in the sequence, reinforcement learning and supervised learning with a set of good samples and a set of bad samples and by applying an obtained constraint for a current task to a next task,
  - wherein each performance of the repeating step comprises training a neural network to predict a constraint corresponding to the current task with the set of good samples and the set of bad samples to provide outputs of the reinforcement learning as inputs to the supervised learning.

17. The computer processing system of claim 16, wherein the processor device repeats the reinforcement learning and the supervised learning by training a protagonist policy and an antagonist policy by reinforcement learning by restricting predicted actions according to the trained neural network.

18. The computer processing system of claim 17, wherein the constraint is an inequality constraint.

* * * * *